United States Patent
Ozeki et al.

(10) Patent No.: US 10,727,463 B2
(45) Date of Patent: Jul. 28, 2020

(54) LONG POROUS SEPARATOR SHEET, METHOD FOR PRODUCING THE SAME, ROLL, AND LITHIUM-ION BATTERY

(71) Applicant: Sumitomo Chemical Company, Limited, Tokyo (JP)

(72) Inventors: Tomoaki Ozeki, Nihama (JP); Masateru Sembara, Nihama (JP); Daizaburo Yashiki, Niihama (JP)

(73) Assignee: SUMITOMO CHEMICAL COMPANY, LIMITED, Tokyo (JP)

( * ) Notice: Subject to any disclaimer, the term of this patent is extended or adjusted under 35 U.S.C. 154(b) by 0 days.

(21) Appl. No.: 15/312,916

(22) PCT Filed: Apr. 15, 2016

(86) PCT No.: PCT/JP2016/062185
§ 371 (c)(1),
(2) Date: Nov. 21, 2016

(87) PCT Pub. No.: WO2017/179214
PCT Pub. Date: Oct. 19, 2017

(65) Prior Publication Data
US 2019/0027726 A1    Jan. 24, 2019

(51) Int. Cl.
*H01M 2/14* (2006.01)
*H01M 2/16* (2006.01)
*H01M 10/0525* (2010.01)

(52) U.S. Cl.
CPC ........... *H01M 2/145* (2013.01); *H01M 2/166* (2013.01); *H01M 2/1653* (2013.01); *H01M 2/1686* (2013.01); *H01M 10/0525* (2013.01)

(58) Field of Classification Search
CPC .... H01M 2/145; H01M 2/1653; H01M 2/166; H01M 2/1686; H01M 10/0525; B26D 1/02; B26D 1/1435; B26D 3/00; B26D 7/32; B65H 18/145; B65H 27/00; B65H 2301/4148; B65H 18/08; B65H 35/02; B65H 2701/19; Y02E 60/122; Y02P 70/54
See application file for complete search history.

(56) References Cited

U.S. PATENT DOCUMENTS

| | | | |
|---|---|---|---|
| 2,006,392 A | 7/1935 | Greider et al. | |
| 3,459,086 A | 8/1969 | Reeder | |
| 3,847,047 A | 11/1974 | Jackson | |
| 6,103,050 A | 8/2000 | Krueger | |
| 6,501,014 B1 | 12/2002 | Kubota et al. | |
| 6,613,253 B1 | 9/2003 | Negishi et al. | |
| 6,912,942 B2 | 7/2005 | Flament | |
| 7,117,776 B1* | 10/2006 | Grafe | B23D 25/12 83/287 |
| 7,240,595 B2 | 7/2007 | Kato et al. | |
| 2001/0003939 A1 | 6/2001 | Liu et al. | |
| 2002/0132162 A1 | 9/2002 | Takata et al. | |
| 2003/0000360 A1 | 1/2003 | Sanda | |
| 2003/0164214 A1 | 9/2003 | Miyazaki | |
| 2004/0173069 A1* | 9/2004 | Shoudai | B26D 1/0006 83/13 |
| 2004/0242130 A1 | 12/2004 | Kato et al. | |
| 2005/0214637 A1 | 9/2005 | Imachi et al. | |
| 2010/0218653 A1 | 9/2010 | Okihara | |
| 2011/0027660 A1 | 2/2011 | Takeda et al. | |
| 2011/0293977 A1 | 12/2011 | Kim et al. | |
| 2012/0024123 A1 | 2/2012 | Nakajima et al. | |
| 2012/0156569 A1 | 6/2012 | Kia et al. | |
| 2012/0219864 A1 | 8/2012 | Ikoma et al. | |
| 2013/0101889 A1 | 4/2013 | Mizuno et al. | |
| 2014/0227602 A1 | 8/2014 | Sumida et al. | |
| 2014/0322585 A1 | 10/2014 | Iizuka et al. | |
| 2014/0374947 A1 | 12/2014 | Ichinomiya et al. | |
| 2015/0002792 A1 | 1/2015 | Hirata et al. | |
| 2015/0202647 A1 | 7/2015 | Watanabe et al. | |
| 2016/0322619 A1* | 11/2016 | Watanabe | B26D 7/18 |
| 2019/0027727 A1 | 1/2019 | Ozeki et al. | |

FOREIGN PATENT DOCUMENTS

| | | |
|---|---|---|
| CN | 201478365 U | 5/2010 |
| CN | 102334216 A | 1/2012 |
| CN | 102962858 A | 3/2013 |
| CN | 103958771 A | 7/2014 |
| JP | 11-144713 | 5/1999 |
| JP | 2000-167794 A | 6/2000 |
| JP | 2001260077 A | 9/2001 |
| JP | 2002-110146 A | 4/2002 |
| JP | 2002-273684 A | 9/2002 |
| JP | 2003080489 A | 3/2003 |
| JP | 2005-066796 A | 3/2005 |
| JP | 2005-285385 A | 10/2005 |
| JP | 3164798 U | 12/2010 |

(Continued)

OTHER PUBLICATIONS

Derwent English abstract for JP2005-66796 (Murayama et al). (Year: 2005).*
Office Action dated Oct. 3, 2017 in JP Application No. 2016544648 (Partial Translation).
Mukai, Hideo, "Suritta, Riwainda No Gijutsu Dokuhon," (Technical Book for Slitter and Rewinder), the Augmented Edition, Converting Technical Institute, pp. 37-39 (Apr. 23, 2005).
Notice of Request for Consultation dated Aug. 19, 2016 in KR Application No. 10-2016-7013978.
Office Action dated Aug. 23, 2016 in JP Application No. 2016-544632.
Int'l Search Report and Written Opinion dated Jun. 7, 2016 in Int'l Application No. PCT/JP2016/062186.
Office Action dated Aug. 19, 2016 in KR Application No. 10-2016-7013978.
Request for Consultation dated Aug. 19, 2016 in KR Application No. 10-2016-7013975.
Office Action dated Aug. 23, 2016 in JP Application No. 2016-544648.

(Continued)

*Primary Examiner* — Anca Eoff
(74) *Attorney, Agent, or Firm* — Panitch Schwarze Belisario & Nadel LLP

(57) ABSTRACT

A lateral surface (12e) of a long separator sheet (12a, 12b) has a value of edge length (R)/longer side length (P) which is less than 1.04. It is therefore possible to provide the long porous separator sheet that is less likely to be torn in processing.

1 Claim, 11 Drawing Sheets

(56) References Cited

FOREIGN PATENT DOCUMENTS

| | | | |
|---|---|---|---|
| JP | 2011148035 A | 8/2011 | |
| JP | 2011159434 A | 8/2011 | |
| JP | 2012-199020 A | 10/2012 | |
| JP | 2013-251201 A | 12/2013 | |
| JP | 2013243059 A | 12/2013 | |
| JP | 2015-185347 A | 10/2015 | |
| JP | 2015-185372 A | 10/2015 | |
| JP | 2015-201323 A | 11/2015 | |
| JP | 5885888 B1 | 3/2016 | |
| JP | 5886480 B1 | 3/2016 | |
| JP | 6122224 B1 | 4/2017 | |
| KR | 940007845 B1 | 8/1994 | |
| KR | 20140107256 A | 9/2014 | |
| KR | 20140131949 A | 11/2014 | |
| KR | 2015-0141403 A | 12/2015 | |
| WO | 2009-123015 A1 | 10/2009 | |
| WO | 2011/055596 A1 | 5/2011 | |
| WO | 2014025004 A1 | 2/2014 | |

OTHER PUBLICATIONS

Int'l Search Report and Written Opinion dated May 17, 2016 in Int'l Application No. PCT/JP2016/062185.
Office Action dated Aug. 19, 2016 in KR Application No. 10-2016-7013975.
Office Action dated Nov. 22, 2016 in JP Application No. 2016-544648.
Office Action dated Dec. 21, 2016 in KR Application No. 10-2016-7013975.
Office Action dated Dec. 21, 2016 in KR Application No. 10-2016-7013978.
Office Action dated Dec. 13, 2016 in JP Application No. 2016-544632.
Office Action dated Apr. 18, 2017 in KR Application No. 10-2016-7013975.
Office Action dated May 17, 2018 in CN Application No. 201680001616.8.
Office Action dated Feb. 26, 2019 in JP Application No. 2017-067711 (partial translation).
Office Action dated Apr. 29, 2019 in U.S. Appl. No. 15/312,924, by Ozeki.
Office Action dated Jan. 11, 2019 in CN 201680001616.8.
Office Action dated Aug. 23, 2019 in U.S. Appl. No. 15/312,924, by Ozeki.
Advisory Action dated Feb. 25, 2020 in U.S. Appl. No. 14/780,722, by Watanabe.
Advisory Action dated Apr. 25, 2019 in U.S. Appl. No. 14/780,722, by Watanabe.
Advisory Action dated Dec. 8, 2017 in U.S. Appl. No. 14/780,722, by Watanabe.
Decision of Patent Cancellation dated Aug. 22, 2018 in KR Application No. 1020157026463.
International Preliminary Report on Patentability dated Jul. 6, 2017 in International Application No. PCT/JP2015/065013.
International Search Report on Patentability dated Aug. 25, 2015 in International Application No. PCT/JP2015/065013.
Notice of Preliminary Patent Cancellation dated May 1, 2018 in KR Application No. 1020157026463.
Office Action dated Jan. 6, 2020 in U.S. Appl. No. 15/312,924, by Ozeki.
Office Action dated Feb. 15, 2017 in CN Application No. 201580000431.0.
Office Action dated Apr. 21, 2017 in U.S. Appl. No. 14/780,722, by Watanabe.
Office Action dated Jun. 4, 2018 in U.S. Appl. No. 14/780,722, by Watanabe.
Office Action dated Jun. 28, 2019 in U.S. Appl. No. 14/780,722, by Watanabe.
Office Action dated Aug. 18, 2015 in JP Application No. 2015527732.
Office Action dated Sep. 5, 2017 in U.S. Appl. No. 14/780,722, by Watanabe.
Office Action dated Oct. 15, 2018 in CN Application No. 201710804519.9.
Office Action dated Nov. 19, 2018 in U.S. Appl. No. 14/780,722, by Watanabe.
Office Action dated Dec. 10, 2019 in U.S. Appl. No. 14/780,722, by Watanabe.
Patent Cancellation Petition dated Aug. 28, 2017 in KR Application No. 101717004.
U.S. Appl. No. 15/312,924, filed Nov. 21, 2016, Tomoaki Ozeki et al.
Office Action dated Apr. 27, 2020 in U.S. Appl. No. 15/312,924, by Ozeki.

* cited by examiner

LONG POROUS SEPARATOR SHEET, METHOD FOR PRODUCING THE SAME, ROLL, AND LITHIUM-ION BATTERY

CROSS-REFERENCE TO RELATED APPLICATION

This application is a Section 371 of International Application No. PCT/JP2016/062185, filed Apr. 15, 2016, and the disclosure of which is incorporated herein by reference.

TECHNICAL FIELD

The present invention relates to (i) a long porous separator sheet which has been slit so as to be used in a battery such as a lithium-ion battery, (ii) a method for producing the long porous separator sheet, (iii) a porous separator roll prepared by winding the long porous, separator sheet on a core, and (iv) a lithium-ion battery including a porous separator which has been obtained fay cutting the long porous separator sheet in a predetermined length.

BACKGROUND ART

A separator original sheet used for a lithium-ion battery is slit (cut) in a lengthwise direction of the original sheet, and it is thus possible to obtain a plurality of long separator sheets each of which has a predetermined slit width in a direction perpendicular to the lengthwise direction.

Each of the plurality of long separator sheets is wound on a core and is then supplied to a battery production process as a separator roll. In the battery production process, each of the plurality of long separator sheets is cut in a predetermined length in a direction perpendicular to the slit width, and is thus used as a separator.

As such, a lateral surface itself of the long separator sheet which has been obtained by slitting serves as a lateral surface of a battery separator, and therefore a shape of the lateral surface is important.

In view of this, Patent Literature 1 discloses a separator which includes a base material layer and an inorganic layer and has a lateral surface that is formed into a taper shape in order to inhibit the inorganic layer from being peeled off from the base material layer in a case where the separator is bent.

Meanwhile, Patent Literature 2 discloses that a photosensitive material is cut with a shear cutting method so that a lateral surface thereof lies at a right angle.

CITATION LIST

Patent Literature

[Patent Literature 1]
Japanese Patent Application Publication Tokukai No. 2012-199020 (Publication date: Oct. 18, 2012)
[Patent Literature 2]
Japanese Patent Application Publication Tokukai No. 2005-66796 (Publication date: Mar. 17, 2005)

SUMMARY OF INVENTION

Technical Problem

In a wound-type battery, a separator is provided between a positive electrode and a negative electrode and is wound, together with the positive electrode and the negative electrode, in a machine direction (MD: a lengthwise direction of a long separator sheet). Further, the positive electrode material, the negative electrode material, and the separator which have been wound are inserted into a cylindrical container. Therefore, with regard to the positive electrode material, the negative electrode material, and the separator which have been wound and inserted into the cylindrical container, a lateral surface of a battery separator, which surface corresponds to a slit lateral surface of the long separator sheet, is exposed.

In a laminated-type battery, a separator is to be placed on a positive electrode or a negative electrode so as to cover the positive electrode or the negative electrode. Therefore, as with a case of the wound-type battery, a lateral surface of a battery separator, which surface corresponds to a slit lateral surface of the long separator sheet, is exposed.

Moreover, while a battery is being assembled, the slit lateral surface of the long separator sheet is also exposed.

In a case where straightness of the slit lateral surface of the long separator sheet, or the lateral surface of the battery separator, which surfaces are exposed while the battery is being assembled, is low, the long separator sheet or the battery separator is more likely to be caught on something and may accordingly be torn.

Note that the straightness of the slit lateral surface of the long separator sheet or the lateral surface of the battery separator is represented by a value of R/P, where P is a linear distance between two points on a straight line along the MD on each of the lateral surfaces, and R is a distance along a shape of the lateral surface between the two points on the straight line along the MD. In a case where the value of R/P is large, this means that distortion in a direction perpendicular to the MD is large. Meanwhile, in a case where the value of R/P is small, this means that distortion in the direction perpendicular to the MD is small.

Therefore, the straightness of the slit lateral surface of the long separator sheet and the lateral surface of the battery separator is important.

However, Patent Literature 1 merely discloses that both lateral surfaces of the separator are formed into the taper shape in order to inhibit the inorganic layer from being peeled off from the base material layer and does not give attention to straightness of the lateral surface of the separator at all.

Moreover, Patent Literature 2 merely discloses that a non-porous material is cut with a shear cutting method so that both lateral surfaces thereof lie at a right angle, and straightness of a lateral surface of such a non-porous material is not so important because the straightness of the non-porous material is high in the first place, unlike a porous material such as a separator.

The present invention is accomplished in view of the problem, and its object is to provide (i) a long porous separator sheet which is less likely to be torn in processing and (ii) a method for producing such a long porous separator sheet.

Solution to Problem

In order to attain the object, in the long porous separator sheet of the present inventions a lateral surface of the long porous separator sheet has a value of R/P that is less than 1.04, where P is a linear distance between two points on a straight line in a lengthwise direction in an image of the lateral surface, and R is a distance along a shape of the lateral surface between the two points on the straight line in the lengthwise direction, the linear distance P and the distance R being obtained by binarizing the image between the long porous separator sheet and a part other than the long porous separator sheet.

According to the configuration, the value of R/P of the lateral surface of the long porous separator sheet is less than 1.04. As such, the straightness of the lateral surface is high even though the long parous separator sheet is made of a porous material, and it is therefore possible to reduce a possibility that the long separator sheet is torn in processing.

In order to attain the object, the method of the present invention for producing a long porous separator sheet includes the step of slitting a porous separator original sheet in a lengthwise direction of the porous separator original sheet, the slitting step including forming a lateral surface of the long porous separator sheet with use of a slitting section including an tipper blade and a lower blade which rotate in different directions, the upper blade making contact with one of two lower blades in a space formed between the two lower blades which are adjacent in a transverse direction that is perpendicular to the lengthwise direction.

According to the method, it is possible to form the lateral surface of the long porous separator sheet whose straightness is high even though the long porous separator sheet is made of a porous material. It is therefore possible to reduce a possibility that the long separator sheet is torn in processing.

Advantageous Effects of Invention

According to an aspect of the present invention, it is possible to provide (i) a long porous separator sheet which is less likely to be torn in processing and (ii) a method for producing such a long porous separator sheet.

Figure 4:
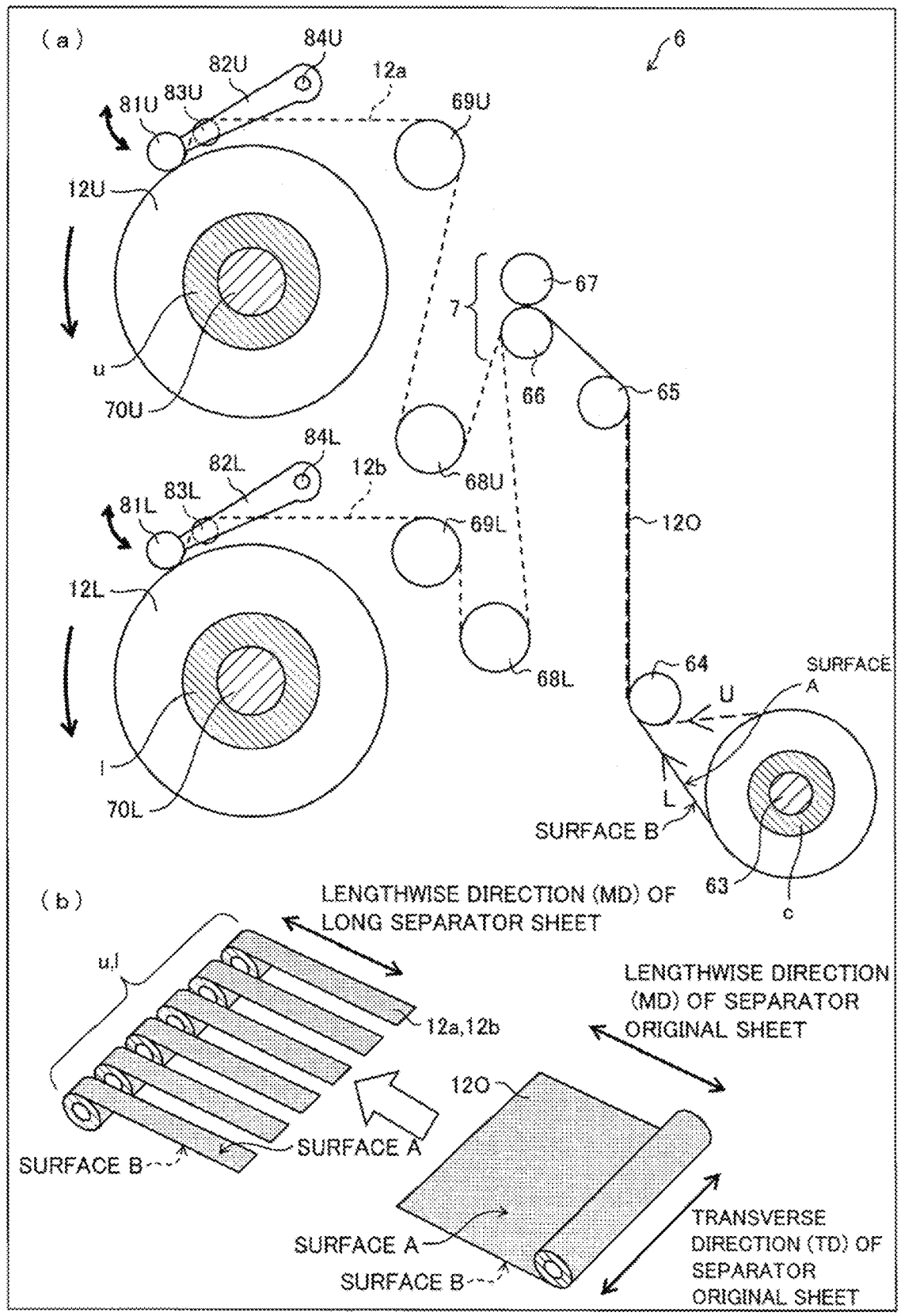

(a) of FIG. 4 is a schematic view illustrating a configuration of a slitting apparatus for slitting a separator original sheet, and (b) of FIG. 4 is a view illustrating a state in which the separator original sheet is slit into a plurality of long separator sheets by the slitting apparatus.

Figure 5:
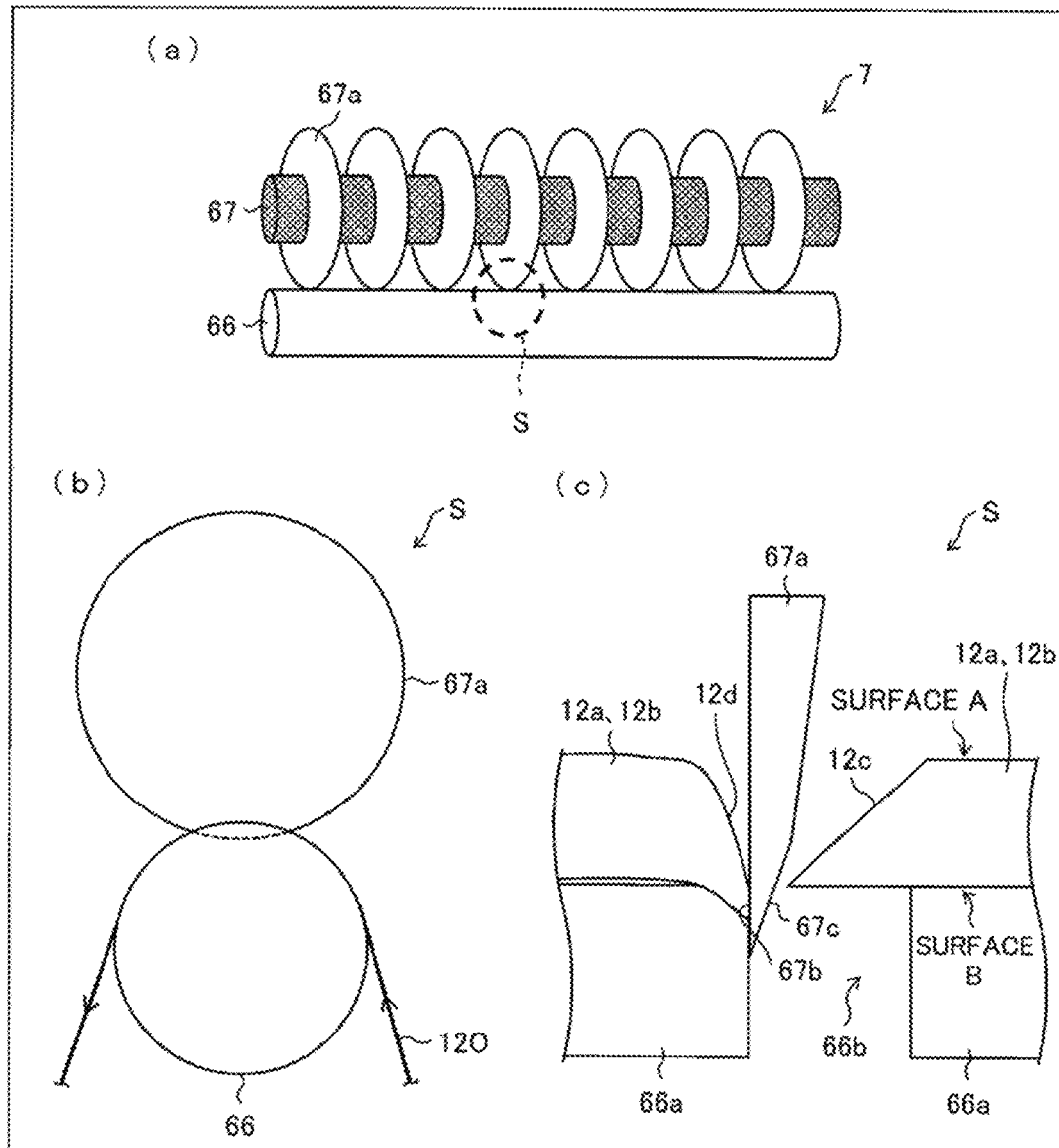

(a) of FIG. 5 is a view illustrating a cutting device which operates in a shear cutting mode and is provided in the slitting apparatus illustrated in FIG. 4, (b) of FIG. 5 is a view illustrating a slitting section which is provided in the cutting device that operates in the shear cutting mode, and (c) of FIG. 5 is a view illustrating a state in which a separator original sheet is slit by the slitting section.

Figure 6:
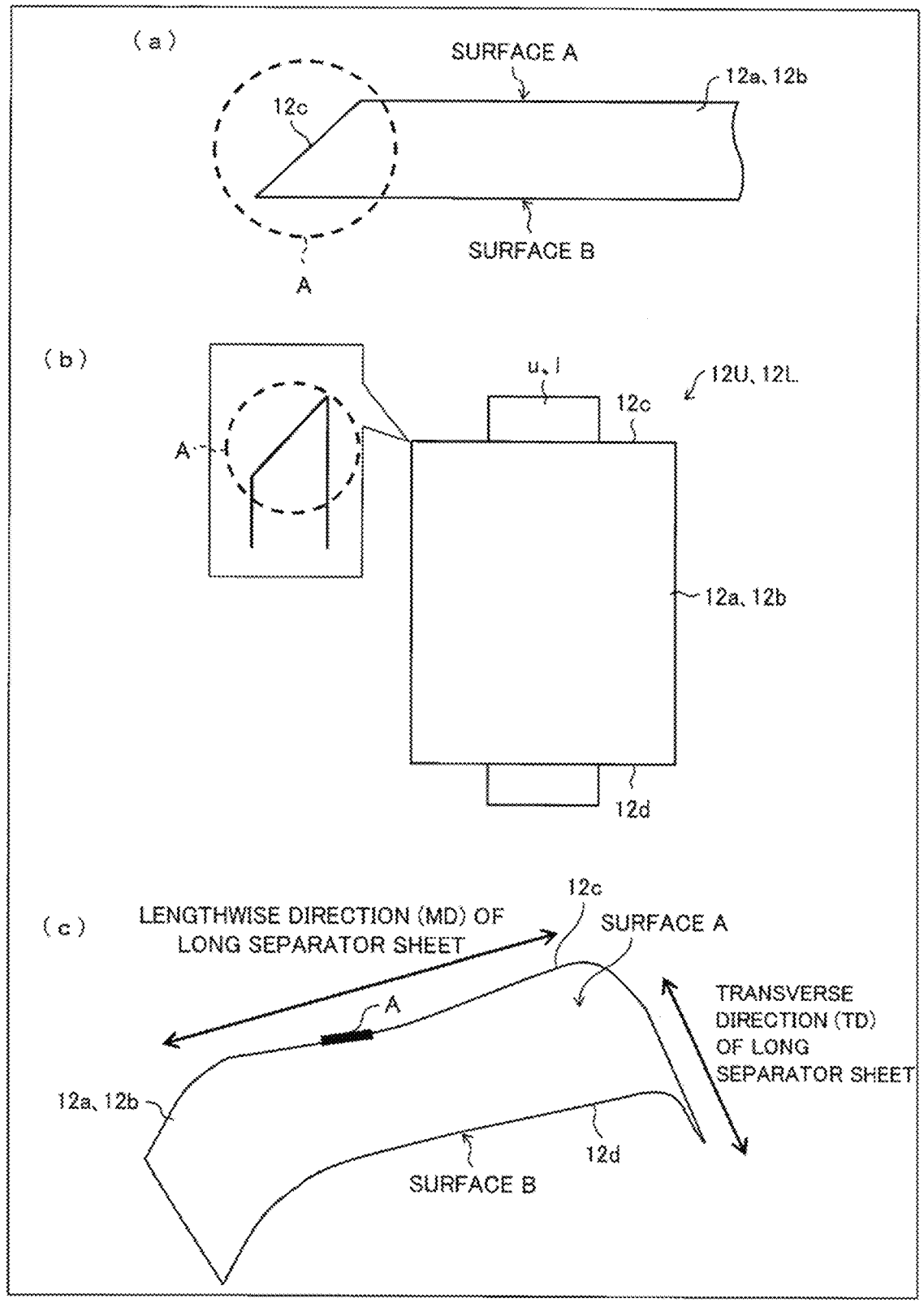

FIG. 6 is a view illustrating a part of a lateral surface of a long separator sheet in which part straightness is evaluated.

Figure 7:
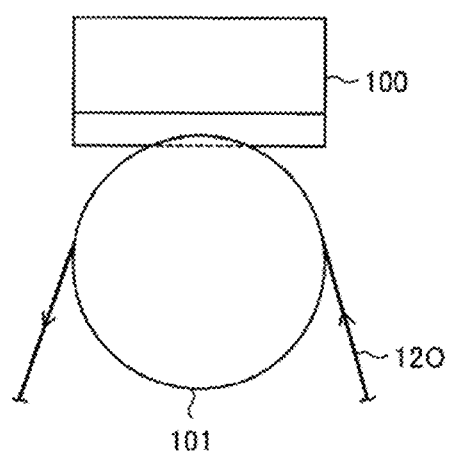

FIG. 7 is a view for explaining a cutting method carried out with a razor blade.

Figure 8:
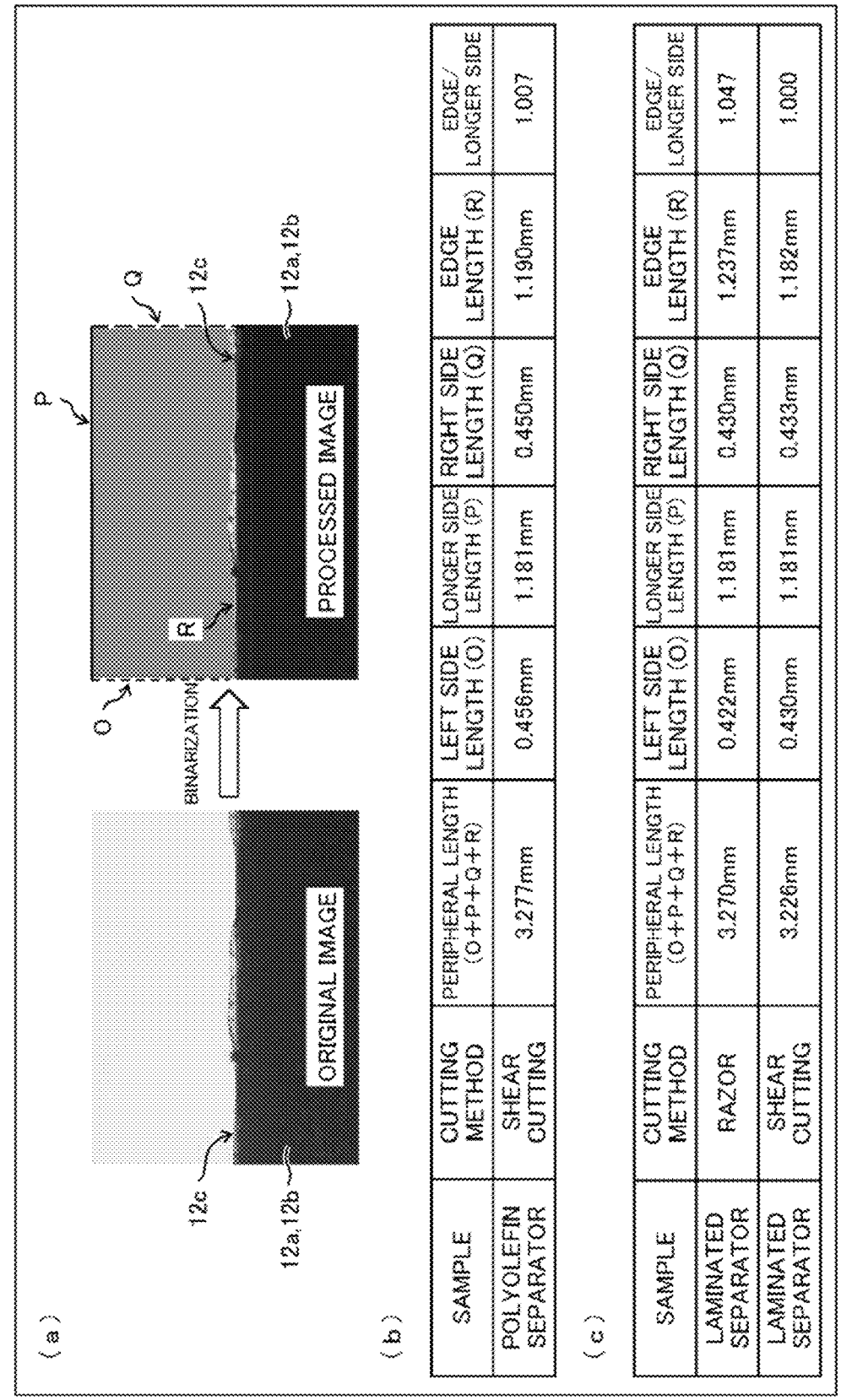

(a) of FIG. 8 is a view for explaining a method for evaluating straightness of a lateral surface of a long separator sheet, and (b) and (c) of FIG. 8 are views showing evaluation results of the straightness.

Figure 9:
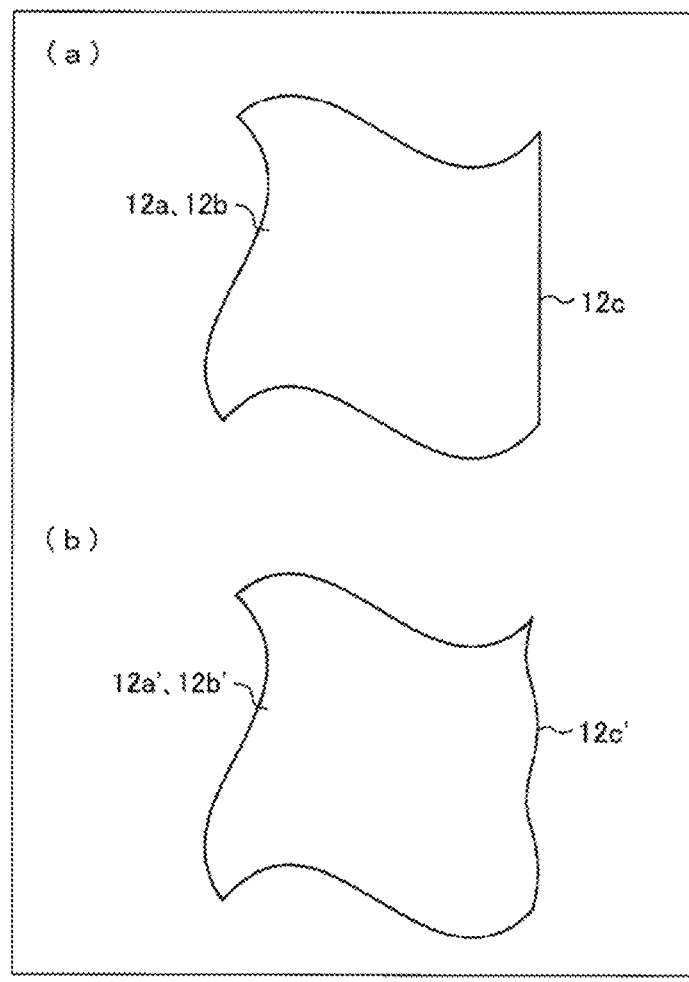

(a) of FIG. 9 is a schematic view illustrating straightness of a lateral surface of a long separator sheet in accordance with the present embodiment, and (b) of FIG. 9 is a schematic view illustrating straightness of a lateral surface of a long separator sheet which has been slit with a razor cutting method.

Figure 10:
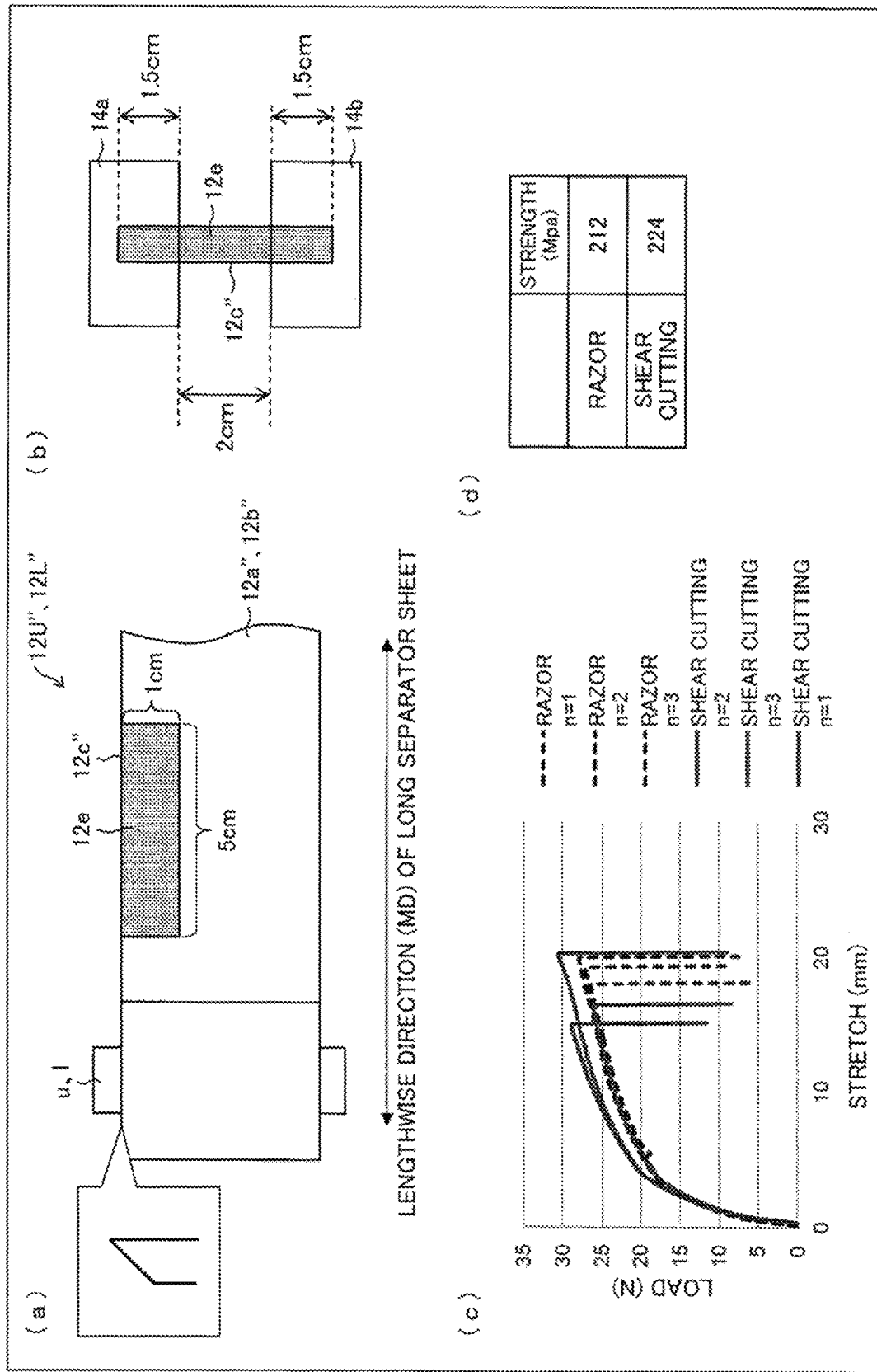

FIG. 10 is a view for explaining (i) a method for measuring tensile strength of a specimen whose one lateral surface is a lateral surface of a long porous separator sheet made of polyethylene and (ii) results of the measurement.

Figure 11:
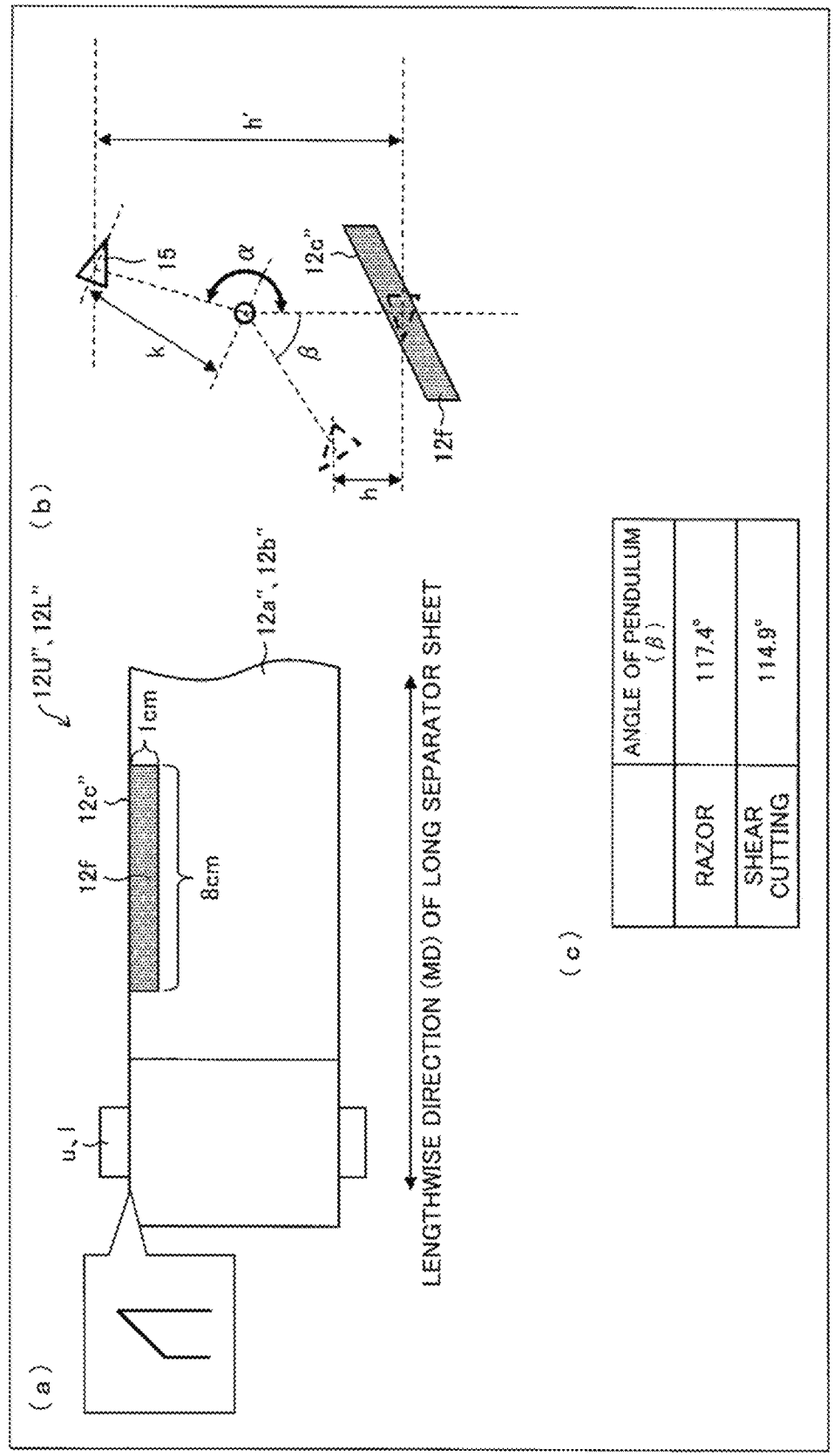

FIG. 11 is a view for explaining (i) a measuring method in the Charpy impact test carried out on a specimen whose one lateral surface is a lateral surface of a long porous separator sheet made of polyethylene and (ii) results of the measurement.

DESCRIPTION OF EMBODIMENTS

[Basic Configuration]

The following description will discuss in order a lithium-ion secondary battery, a separator, a heat resistant separator, a method for producing the heat resistant separator, and a slitting apparatus.

(Lithium-Ion Secondary Battery)

A nonaqueous electrolyte secondary battery, typically, a lithium-ion secondary battery has a high energy density, and therefore, currently widely used not only as batteries for use in devices such as personal computers, mobile phones, and mobile information terminals, and for use in moving bodies such as automobiles and airplanes, but also as stationary batteries contributing to stable power supply.

Figure 1:
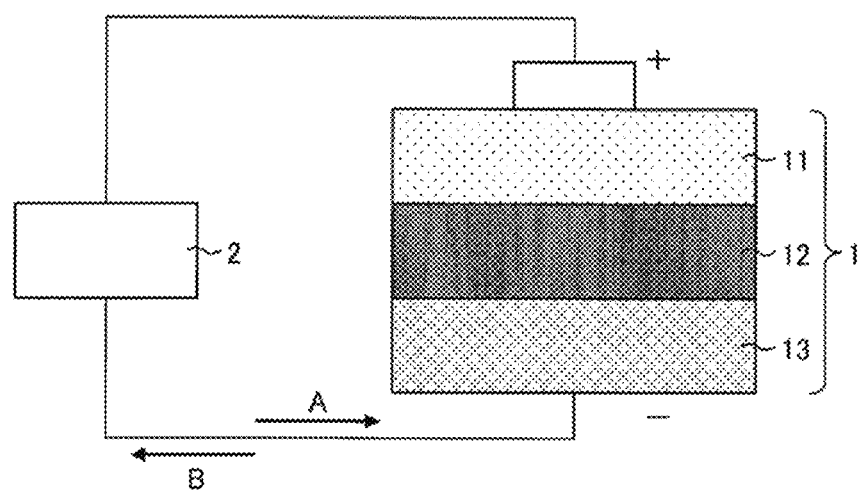
FIG. 1 is a schematic view illustrating a cross sectional configuration of a lithium-ion secondary battery.

FIG. 1 is a schematic view illustrating a cross sectional configuration of a lithium-ion secondary battery 1.

As illustrated in FIG. 1, the lithium-ion secondary battery 1 includes a cathode 11, a separator 12, and an anode 13. Between the cathode 11 and the anode 13, an external device 2 is connected outside the lithium-ion secondary battery 1. While the lithium-ion secondary battery 1 is being charged, electrons move in a direction A. On the other hand, while the lithium-ion secondary battery 1 is being discharged, electrons move in a direction B.

(Separator)

The separator 12 is provided so as to be sandwiched between the cathode 11 which is a positive electrode of the lithium-ion secondary battery 1 and the anode 13 which is a negative electrode of the lithium-ion secondary battery 1. The separator 12 is a porous film that separates the cathode 11 and the anode 13, allowing lithium ions to move between the cathode 11 and the anode 13. The separator 12 contains, for example, polyolefin such as polyethylene or polypropylene as a material.

Figure 2:
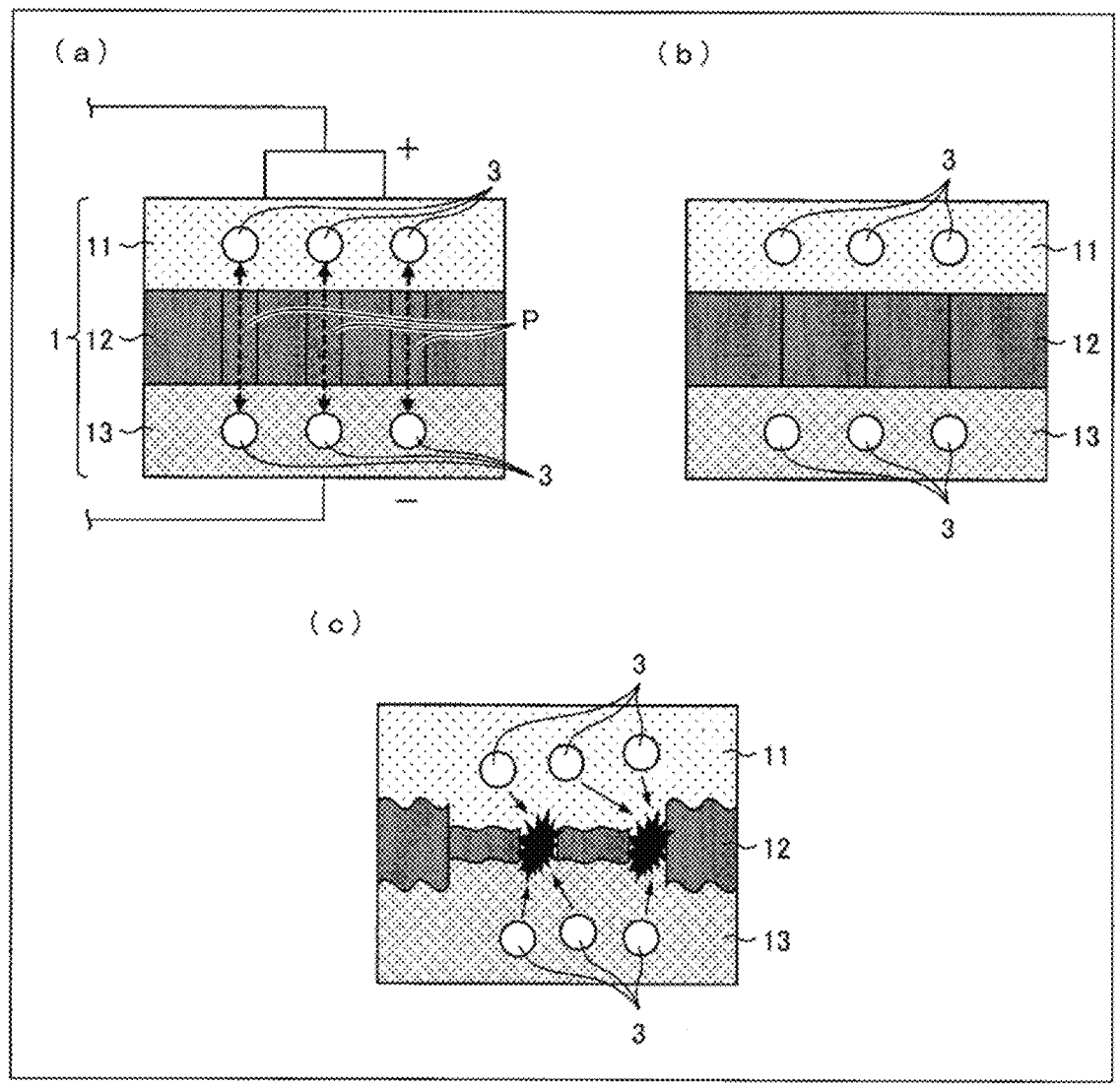
FIG. 2 is a schematic view illustrating details of the configuration of the lithium-ion secondary battery illustrated in FIG. 1.

FIG. 2 is a schematic view illustrating details of the configuration of the lithium-ion secondary battery 1 illustrated in FIG. 1. (a) of FIG. 2 illustrates a normal configuration. (b) of FIG. 2 illustrates a state in which a temperature of the lithium-ion secondary battery 1 has risen. (c) of FIG. 2 illustrates a state in which a temperature of the lithium-ion secondary battery 1 has sharply risen.

As illustrated in (a) of FIG. 2, the separator 12 is provided with many pores P. Normally, lithium ions 3 in the lithium-ion secondary battery 1 can move back and forth through the pores P.

Here, there are, for example, cases in which the temperature of the lithium-ion secondary battery 1 rises due to excessive charging of the lithium-ion secondary battery 1, a high current caused by short-circuiting of the external device, or the like. In such cases, the separator 12 melts or softens and the pores P are blocked as illustrated in (b) of FIG. 2. As a result, the separator 12 shrinks. This stops the movement of the lithium ions 3, and consequently slops the above described temperature rise.

However, in a case where a temperature of the lithium-ion secondary battery 1 sharply rises, the separator 12 suddenly shrinks. In this case, as illustrated in (c) of FIG. 2, the separator 12 may be destroyed. Then, the lithium ions 3 leak out from the separator 12 which has been destroyed. As a result, the lithium ions 3 do not stop moving. Consequently, the temperature continues rising.

(Heat Resistant Separator)

Figure 3:
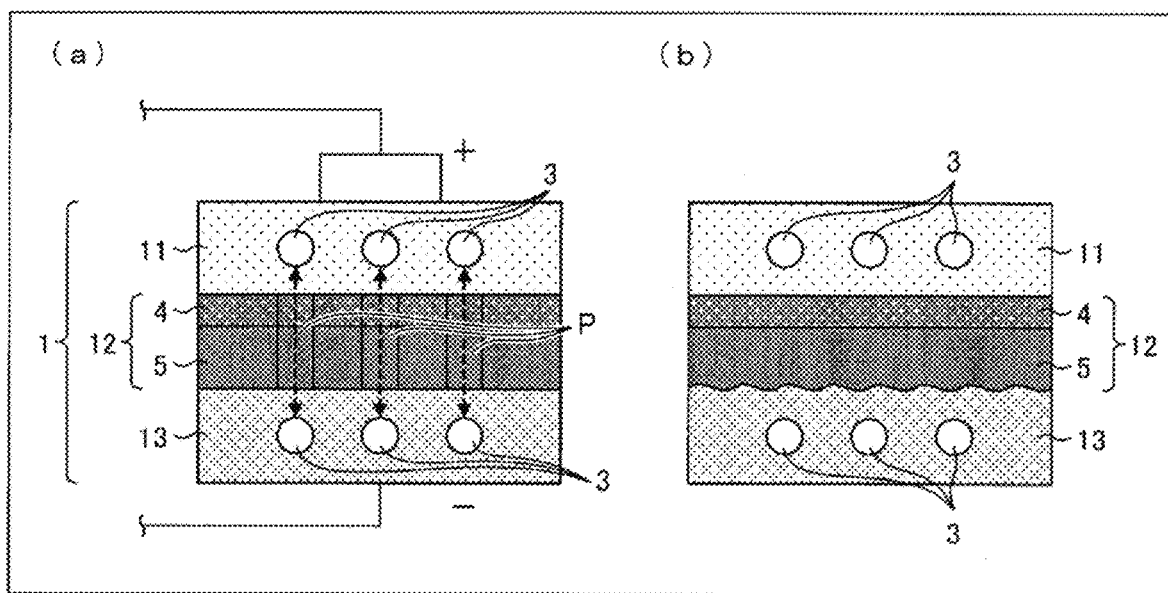
FIG. 3 is a schematic view illustrating another configuration of the lithium-ion secondary battery illustrated in FIG. 1.

FIG. 3 is a schematic view illustrating another configuration of the lithium-ion secondary battery 1 illustrated in FIG. 1. (a) of FIG. 3 illustrates a normal configuration, and (b) of FIG. 3 illustrates a state in which a temperature of the lithium-ion secondary battery 1 has sharply risen.

As illustrated in (a) of FIG. 3, the separator 12 can be a heat resistant separator that includes a porous film 5 and a heat resistant layer 4. The heat resistant layer 4 is laminated on a surface of the porous film 5 which surface is on a cathode 11 side. Note that the heat resistant layer 4 can alternatively be laminated on a surface of the porous film 5 which surface is on an anode 13 side, or both surfaces of the porous film 5. Further, the heat resistant layer 4 is provided with, pores which are similar to the pores P. Normally, the lithium ions 3 move through the pores P and the pores of the heat resistant layer 4. The heat resistant layer 4 contains, for example, wholly aromatic polyamide (aramid resin) as a material.

As illustrated in (b) of FIG. 3, even in a case where the temperature of the lithium-ion secondary battery 1 sharply rises and as a result, the porous film 5 melts or softens, the shape of the porous film 5 is maintained because the heat resistant layer 4 supports the porous film 5. Therefore, such a sharp temperature rise results in only melting or softening of the porous film 5 and consequent blocking of the pores P. This stops movement of the lithium ions 3 and consequently stops the above-described excessive discharging or excessive charging. In this way, the separator 12 can be prevented from being destroyed.

(Production Steps of the Heat Resistant Separator)

How to produce the heat resistant separator of the lithium-ion secondary battery 1 is not specifically limited. The heat resistant separator can be produced by a well-known method. The following discussion assumes a case where the porous film 5 contains polyethylene as a main material. However, even in a case where the porous film 5 contains another material, the similar steps can still be applied to production of the separator 12.

For example, it is possible to employ a method including the steps of first forming a film by adding a plasticizer to a thermoplastic resin, and then removing the plasticizer with an appropriate solvent. For example, in a case where the porous film 5 is made of a polyethylene resin containing ultrahigh molecular weight polyethylene, it is possible to produce the porous film 5 by the following method.

This method includes (1) a kneading step of obtaining a polyethylene resin composition by kneading a ultrahigh molecular weight polyethylene and an inorganic filler such as calcium carbonate, (2) a rolling step of forming a film with the polyethylene resin composition, (3) a removal step of removing the inorganic filler from the film obtained in the step (2), and (4) a stretching step of obtaining the porous film 5 by stretching the film obtained in the step (3).

In the removal step, many fine pores are provided in the film. The fine pores of the film stretched in the stretching step become the above-described pores P. The porous film 5 formed as a result is a polyethylene microporous film having a predetermined thickness and a predetermined air permeability.

Note that, in the kneading step, 100 parts by weight of the ultrahigh molecular weight polyethylene, 5 parts by weight to 200 parts by weight of a low-molecular weight polyolefin having a weight-average molecular weight of 10000 or less, and 100 parts by weight to 400 parts by weight of the inorganic filler can be kneaded.

Subsequently, in a coating step, the heat resistant layer 4 is formed on a surface of the porous film 5. For example, on the porous film 5, an aramid/NMP (N-methylpyrrolidone) solution (coating solution) is applied, and thereby the heat resistant layer 4 that is an aramid heat resistant layer is formed. The heat resistant layer 4 can be provided on only one surface or both surfaces of the porous film 5. Alternatively, for coating, the heat resistant layer 4 can be formed by using a mixed solution containing a filler such as alumina/carboxymethyl cellulose.

A method for coating the porous film 5 with a coating solution is not specifically limited as long as uniform wet coating can be carried out by the method. The method can be a conventionally well-known method such as a capillary coating method, a spin coating method, a slit die coating method, a spray coating method, a dip coating method, a roll coating method, a screen printing method, a flexo printing method, a bar coater method, a gravure coater method, or a die coater method. The heat resistant layer 4 has a thickness which can be controlled by adjusting (i) a thickness of a coating wet film and (ii) a solid-content concentration in the coating solution.

Note that it is possible to use a resin film, a metal belt, a metal drum, or the like as a support with which the porous film 5 is fixed or transferred in coating.

As described above, it is possible to produce the separator 12 (heat resistant separator) in which the heat resistant layer 4 is laminated on the porous film 5. Thus produced separator is wound on a cylindrical core. Note that a subject to be produced by the above production method is not limited to the heat resistant separator. The above production method does not necessarily include the coating step. In a case where the method includes no coating step, the subject to be produced is a separator including no heat resistant layer.

(Slitting Apparatus)

The heat resistant separator or the separator including no heat resistant layer (hereinafter, referred to as "separator") preferably has a width (hereinafter, referred to as "product width") suitable for application products such as the lithium-ion secondary battery 1. However, for improving productivity, the separator is produced so as to have a width that is equal to or larger than a product width. This is referred to as a separator original sheet. After the separator original sheet is once produced, the separator original sheet is cut (slit) by the slitting apparatus so that a "separator width" (which means a length in a direction substantially perpendicular to a lengthwise direction and a thickness direction) of the separator original sheet becomes the product width, and thus a long separator sheet is obtained.

In the following descriptions, a wide separator which is before being slit is referred to as "separator original sheet", and a separator which has been slit so as to have a separator width that is the product width is particularly referred to as "long separator sheet". Note that "slitting" means to slit the separator original sheet in the lengthwise direction (i.e., a flow direction of the film during production; MD: machine direction), and that "cutting" means to cut the long separator sheet in a transverse direction (TD). The "transverse direction (TD)" means a direction which is substantially perpendicular to the lengthwise direction (MD) and the thickness direction of the long separator sheet.

Embodiment 1

(Configuration of Slitting Apparatus)

(a) of FIG. 4 is a schematic view illustrating a configuration of a slitting apparatus 6 which includes a cutting device 7 that operates in a shear cutting mode. (b) of FIG. 4 is a view illustrating a state in which an original sheet 12O of a separator (porous separator) is slit into long separator sheets (long porous separator sheets) 12a and 12b by the slitting apparatus 6.

Embodiment 1 exemplifies the separator original sheet 12O in which a wholly aromatic polyamide (aramid resin) as the heat resistant layer 4 is laminated on one surface of the porous film 5, as illustrated in FIG. 3. Note, however, that Embodiment 1 is not limited to this, and the separator original sheet 12O can be a porous film 5 on which no heat resistant layer 4 is laminated or can be a sheet in which heat resistant layers 4 are laminated on both surfaces of the porous film 5.

As illustrated in (a) of FIG. 4, the slitting apparatus 6 includes a wind-off roller 63 which is rotatably supported and has a cylindrical shape, rollers 64, 65, 68U, 68L, 69U, and 69L, a first touch roller 81U, a second touch roller 81L, a first arm 82U, a second arm 82L, a first take-up assisting roller 83U, a second take-up assisting roller 83L, a first winding-up roller 70U, a second winding-up roller 70L, and the cutting device 7.

In the slitting apparatus 6, a cylindrical core c is attached onto the wind-off roller 63, and the separator original sheet 12O is wound on the core c. The separator original sheet 12O is wound off from the core c along a route U or L. In a case where the separator original sheet 12O is to be transferred while a surface A of the separator original sheet 12O serves as an upper surface, the separator original sheet 12O is wound off along the route L. Whereas, in a case where the separator original sheet 12O is to be transferred while a surface B of the separator original sheet 12O serves as an upper surface, the separator original sheet 12O is wound off along the route U. Note that, in Embodiment 1, the separator original sheet 12O is transferred while the surface A serves as an upper surface, and therefore the separator original sheet 12O is wound off along the route L.

In Embodiment 1, the surface A is a surface of the porous film 5 which surface is opposite to a surface making contact with the heat resistant layer 4, and the surface B is a surface of the heat resistant layer 4 which surface is opposite to a surface making contact with the porous film 5.

The separator original sheet 12O which has been thus wound off is transferred to the cutting device 7 via the roller 64 and the roller 65, and is then slit into long separator sheets 12a and 12b by the cutting device 7 (see (a) and (b) of FIG. 4).

(Cutting Device and Slitting Section)

(a) of FIG. 5 is a view illustrating the cutting device 7 which operates in a shear cutting mode and is provided in the slitting apparatus 6 illustrated in FIG. 4. (b) of FIG. 5 is a view illustrating a slitting section S provided in the cutting device 7. (c) of FIG. 5 is a view illustrating a state in which the separator original sheet 12O is slit by the slitting section S of the cutting device 7.

As illustrated in (a) of FIG. 5, the cutting device 7 which operates in a shear cutting mode includes a shaft 66 and a shaft 67 each of which has a cylindrical shape. The shaft 66 and the shaft 67 are supported so as to rotate in different directions and are located on a lower side and on an upper side, respectively. The shaft 67 which is on the upper side is provided with a plurality (8 in Embodiment 1) of upper blades 67a each of which is a circular blade. As illustrated in (b) of FIG. 5, the plurality of upper blades 67a each of which is a circular blade are inserted into respective of a plurality (8 in Embodiment 1) of spaces which are provided in the shaft 66 located on the lower side. Note that, as illustrated in (a) of FIG. 5, the cutting device 7 which operates in the shear cutting mode includes a plurality (8 in Embodiment 1) of slitting sections S.

As illustrated in (c) of FIG. 5, each of the slitting sections S, which are provided in the cutting device 7 that operates in the shear cutting mode, includes (i) the upper blade 67a, (ii) lower blades 66a which are adjacent to each other in the transverse direction (TD) that is perpendicular to the lengthwise direction (MD), and (iii) a space 66b that is provided between the lower blades 66a which are adjacent, to each other. Note that the lower blades 66a and the space 66b are provided in the shaft 66 that is located on the lower side.

In each of the slitting sections S, the upper blade 67a is inserted into the space 66b and makes contact with a lateral surface of one of the adjacent two lower blades 66a which one is located on a left side in (c) of FIG. 5.

An edge part of the upper blade 67a has a flat part 67b and an inclined part 67c. The flat part 67b is a part which is to make contact with the lower blade 66a. The inclined part 67c is opposite to the flat part 67b and is inclined so that, the edge part of the upper blade 67a gradually becomes sharper toward a tip of the upper blade 67a.

Note that, in Embodiment 1, an example is described in which the edge part of the upper blade 67a has a cross section in which only one side is inclined but the edge part of the upper blade 67a can have a cross section of a rocking shear, or the like.

In a case where the separator original sheet 12O is slit by the slitting section S thus configured, each of the long separator sheets 12a and 12b is to have (i) a lateral surface 12c that is shaped by the tipper blade 67a (specifically, the inclined part 67c of the upper blade 67a) and the space 66b and (ii) a lateral surface 12d that is shaped by the upper blade 67a (specifically, the flat part 67b of the tipper blade 67a) and the lower blade 66a with which the upper blade 67a contacts.

In Embodiment 1, in order to inhibit, the heat resistant layer 4 from being peeled off, the upper blade 67a is brought into contact with the surface A, i.e., the surface of the porous film 5 which surface is opposite to the surface making contact with the heat resistant layer 4. Note, however, that Embodiment 1 is not limited to this.

Moreover, an angle at which the upper blade 67a makes contact with the lower blade 66a and a pressure with which the upper blade 67a makes contact with the lower blade 66a can be appropriately adjusted to be an angle and a pressure which are suitable for producing the long separator sheets 12a and 12b.

Among the plurality of long separator sheets 12a and 12b which have been slit by the plurality of slitting sections S in the cutting device 7, each of the long separator sheets 12a is transferred via the roller 68U, the roller 69U, and the first take-up assisting roller 83U, and is then wound on a cylindrical core u (bobbin) that is attached onto the first winding-up roller 70U. Moreover, each of the long separator sheets 12b among the plurality of long separator sheets 12a and 12b is transferred via the roller 68L, the roller 69L, and the second take-up assisting roller 83L, and is then wound on a cylindrical core 1 (bobbin) that is attached onto the second winding-up roller 70L, Note that the long separator sheets 12a and 12b which have been wound in rolls are referred to as separator rolls 12U and 12L.

In the separator rolls 12U and 12L, the long separator sheets 12a and 12b are wound so that the surface A of each of the long separator sheets 12a and 12b faces outside and the surface B of each of the long separator sheets 12a and 12b faces inside.

In Embodiment 1, as illustrated in (b) of FIG. 4, the separator original sheet 12O is slit, into seven long separator sheets 12a and 12b (slitting step) by the eight slitting sections S in the transverse direction (TD) and along the lengthwise direction (MD). As such, four odd-numbered long separator sheets 12a and three even-numbered long separator sheets 12b are obtained. The four odd-numbered long separator sheets 12a are wound on the respective cylindrical cores u (bobbin) which are attached onto the first winding-up roller 70U, and the three even-numbered long separator sheets 12b are wound on the respective cylindrical cores 1 (bobbin) which are attached onto the second winding-up roller 70L. Note, however, that Embodiment 1 is not limited to this example, and it is of course possible to appropriately change the number of the long separator sheets 12a and 12b into which the separator original sheet 12O is slit, because the number of the long separator sheets 12a and 12b depends on a size of the separator original sheet 12O and a separator width of each of the long separator sheets 12a and 12b. Note that, in Embodiment 1, long separator sheets which are obtained on both ends by the slitting with use of the eight slitting sections S are not used.

In Embodiment 1, an example is described in which the number of long separator sheets that are wound on the respective cylindrical cores u (bobbin) provided on the first winding-up roller 70U is different from the number of long separator sheets that are wound on the respective cylindrical cores 1 (bobbin) provided on the second winding-tip roller 70L. Note, however, that the number of long separator sheets that are wound on the respective cylindrical cores u can be identical with the number of long separator sheets that are wound on the respective cylindrical cores 1.

(Winding-Up Section)

On the first winding-up roller 70U (winding-up section), four cores u are detachably provided in accordance with the number of the long separator sheets 12a, i.e., the four odd-numbered long separator sheets 12a. Similarly, on the second winding-up roller 70L (winding-up section), three cores 1 are detachably provided in accordance with the number of the long separator sheets 12b, i.e., the three even-numbered long separator sheets 12b.

As illustrated in (a) of FIG. 4, the first winding-up roller 70U rotates in a direction indicated by the arrow in (a) of FIG. 4 together with the core u so as to wind up the long separator sheet 12a (winding-up step). The core u can be detached from the first winding-up roller 70U together with the long separator sheet 12a which has been wound on the core u.

Similarly, the second winding-up roller 70L rotates in a direction indicated by the arrow in (a) of FIG. 4 together with the core 1 so as to wind up the long separator sheet 12b (winding-up step). The core 1 can be detached from the second winding-up roller 70L together with the long separator sheet 12b which has been wound on the core 1.

(Touch Roller)

As illustrated in (a) of FIG. 4, the first touch roller 81U in the slitting apparatus 6 is rotatably provided at (i.e., fixed to) one end of the first arm 82U, and the second touch roller 81L in the slitting apparatus 6 is rotatably provided at (i.e., fixed to) one end of the second arm 82L. The first arm 82U can swing on a rotary shaft 84U (shaft) that is provided at the other end of the first arm 82U, and the second arm 82L can swing on a rotary shaft 84L (shaft) that is provided at the other end of the second arm 82L (in respective directions indicated by arrows in (a) of FIG. 4). The first take-up assisting roller 83U is provided between the first touch roller 81U and the rotary shaft 84U of the first arm 82U and is rotatably fixed to the first arm 82U. The second take-tip assisting roller 83L is provided between the second touch roller 81L and the rotary shaft 84L of the second arm 82L and is rotatably fixed to the second arm 82L.

Note that the first and second touch rollers 81U and 81L press the long separator sheets 12a and 12b, which are to be wound up, onto winding-up surfaces (surfaces) of the separator rolls 12U and 12L, respectively. Here, the first and second touch rollers 81U and 81L press the respective long separator sheets 12a and 12b by utilizing weights of the first and second touch rollers 81U and 81L, respectively. The pressing by the first and second touch rollers 81U and 81L makes it possible to inhibit a wrinkle and the like from occurring in the long separator sheets 12a and 12b to be wound. Note that positions of the first and second touch rollers 81U and 81L change (displace) in accordance with change in outer diameters of the separator rolls 12U and 12L such that the first and second touch rollers 81U and 81L make contact with the winding-up surfaces, respectively.

(Straightness Evaluation of Lateral Surface of Long Separator Sheet)

FIG. 6 is a view illustrating a part of a lateral surface of each of the long separator sheets 12a and 12b in which part straightness is evaluated.

In Embodiment 1, as illustrated in (a) of FIG. 6, straightness of the lateral surface 12c (indicated by A in (a) of FIG. 6) of each of the long separator sheets 12a and 12b was evaluated. Specifically, straightness of a part of the lateral surface 12c which part makes contact with the surface B was evaluated.

This part corresponds of an edge part (indicated by A in (b) of FIG. 6) of the separator rolls 12U and 12L, and also corresponds to a part A of each of the long separator sheets 12a and 12b illustrated in (c) of FIG. 6.

Note that, in the straightness evaluation of the lateral surface of the long separator sheet, a long separator sheet which had been obtained by slitting the separator original sheet 12O with a razor blade (later described) was also used as Comparative Example, in addition to (i) a long separator sheet which had been obtained by slitting the porous film 5, which had no heat resistant layer 4, with the cutting device 7 that operates in the shear cutting mode and (ii) the long separator sheets 12a and 12b each of which had been obtained by slitting the separator original sheet 12O with the cutting device 7 that operates in the shear cutting mode.

FIG. 7 is a view for explaining a conventional cutting (slitting) method carried out with a razor blade.

As illustrated in FIG. 7, the separator original sheet 12O is transferred to a roller 101. The roller 101 has a groove into which an edge of a razor blade 100 can be partially inserted. With the configuration, the separator original sheet 12O is slit into long separator sheets by the razor blade 100 and the groove.

(a) of FIG. 8 is a view for explaining a method for evaluating straightness of a lateral surface of a long separator sheet. (b) of FIG. 8 is a view showing results of straightness evaluation on a lateral surface of a long separator sheet (here, referred to as "polyolefin separator") which has been obtained by slitting the porous film 5, which has no heat resistant layer 4, with the shear cutting method illustrated in FIG. 5. (c) of FIG. 8 is a view showing results of straightness evaluation on the lateral surface 12c of each of the long separator sheets 12a and 12b (here, referred to as laminated separator) which has been obtained by slitting the separator original sheet 12O, in which wholly aromatic poly amide (aramid resin) is laminated as the heat resistant layer 4 on one surface of the porous film 5, with the razor cutting method illustrated in FIG. 7 and the shear cutting method illustrated in FIG. 5.

The following description will discuss a method for evaluating straightness of a lateral surface of a long separator sheet, with reference to an example method for evaluating straightness of the lateral surface 12c of each of the long separator sheets 12a and 12b.

As illustrated in (a) of FIG. 8, first, an original image of the lateral surface 12c is obtained.

Note that a lower part of the original image illustrated in (a) of FIG. 8 is a surface B side of each of the long separator sheets 12a and 12b illustrated in (a) of FIG. 6.

Subsequently, the original image is binarized into each of the long separator sheets 12a and 12b and a part other than each of the long separator sheets 12a and 12b.

By this binarization, it is possible to obtain a processed image in which each of the Jong separator sheets 12a and 12b can be distinguished from the part other than each of the long separator sheets 12a and 12b.

In the processed image, the part other than each of the long separator sheets 12a and 12b has a peripheral length (O+P+Q+R) including a left side length. (O), a longer side length (P), a right side length (Q), and an edge length (R).

Based on this, a value of "edge length (R)/longer side length (P)" was calculated, and thus straightness of the lateral surface of the long separator sheet was evaluated.

Specifically, with use of analysis software "WinROOF (MITANI CORPORATION)", a value of "edge length (R)/longer side length (P)" was obtained through the following processes 1. through 6.
1. Read in the original image.
2. Separate the original image into three colors, i.e., green, red, and blue by color separation.
3. Extract a background by carrying out automatic binarization on a green image obtained by the color separation (discriminant analysis method: modal method).
4. Measure a peripheral length (O+P+Q+R) of a region extracted in the above 3.
5. Measure a three-side line length (O+P+Q) of the region extracted in the above 3., the three-side line length (O+P+Q) excluding an interface between the sample and the background.
6. Subtract the three-side line length (O+P+Q) measured in the above 5. from the peripheral length (Q+P+Q+R) measured in the above 4., and thus calculate an edge length (R).
7. Divide the calculated edge length (R) by the longer side length (P).

The longer side length (P) corresponds to a linear distance between two points on a straight line along the MD on the lateral surface 12c, and the edge length (R) corresponds to a distance which is along a shape of the lateral surface 12c between the two points on the straight line along the MD.

In a case where the value of "edge length (R)/longer side length (P)" is large, this means that distortion in a direction perpendicular to the MD is large. Meanwhile, in a case where the value is small, this means that distortion in the direction perpendicular to the MD is small.

Note that, in order to reduce a possibility that the long separator sheet is torn during processing, the value of "edge length (R)/longer side length (P)" needs to be less than 1.04.

As illustrated in (b) of FIG. 8, in the case of the long separator sheet (here, referred to as "polyolefin separator") which has been obtained by slitting the porous film 5, which has no heat resistant layer 4, with the shear cutting method illustrated in FIG. 5, the value of "edge length (R)/longer side length (P)" was 1.007, which was near to an ideal value, i.e., 1.

From the above result, in the case of the porous film 5 (polyolefin separator) including no heat resistant layer 4, the sufficiently satisfactory straightness of the lateral surface of the long separator sheet could be obtained.

On the other hand, in the case of the long separator sheet (here, referred to as laminated separator) which had been obtained by slitting the separator original sheet 12O, in which wholly aromatic polyamide (aramid resin) was laminated as the heat resistant layer 4 on one surface of the porous film 5, with the razor cutting method illustrated in FIG. 7, the value of "edge length (R)/longer side length (P)" was 1.047, which was greatly different from the ideal value, i.e., 1 (see (c) of FIG. 8).

As such, from the viewpoint of reducing the possibility of being torn during processing, the long separator sheet (laminated separator) which is obtained by slitting the separator original sheet 12O, in which wholly aromatic polyamide (aramid resin) is laminated as the heat resistant layer 4 on one surface of the porous film 5, with the razor cutting method illustrated in FIG. 7 is not preferable.

In the case of the each of the long separator sheets 12a and 12b (here, referred to as laminated separator) which had been obtained by slitting the separator original sheet 12O, in which wholly aromatic polyamide (aramid resin) was laminated as the heat resistant layer 4 on one surface of the porous film 5, with the shear cutting method illustrated in FIG. 5, the value of "edge length (R)/longer side length (P)" was the ideal value, i.e., 1.

From the above results, in the cases of (i) the separator original sheet 12O in which wholly aromatic polyamide (aramid resin) as the heat resistant layer 4 is laminated on one surface of the porous film 5 and (ii) the separator original sheet in which wholly aromatic polyamide (aramid resin) as the heat resistant layer 4 is laminated on both surfaces of the porous film 5, it is necessary to carry out the slitting with the shear cutting method illustrated in FIG. 5 in order to obtain satisfactory straightness of the lateral surface of the long separator sheet.

(a) of FIG. 9 is a schematic view illustrating the straightness of the lateral surface 12c of each of the long separator sheets 12a and 12b (laminated separator) which has been obtained by slitting the separator original sheet 12O, in which wholly aromatic polyamide (aramid resin) is laminated as the heat resistant layer 4 on one surface of the porous film 5, with the shear cutting method illustrated in FIG. 5. (b) of FIG. 9 is a schematic view illustrating the straightness of a lateral surface 12c' of each of long separator sheets 12a' and 12b' (laminated separator) which has been obtained by slitting the separator original sheet 12O, in which wholly aromatic polyamide (aramid resin) is laminated as the heat resistant layer 4 on one surface of the porous film 5, with the razor cutting method illustrated in FIG. 7.

As illustrated in FIG. 9, from the viewpoint of reducing the possibility of being torn during processing, the long separator sheets 12a and 12b having the high straightness of the lateral surface are more preferable than the long separator sheets 12a' and 12b' having the low straightness of the lateral surface.

(Measurement of Tensile Strength)

The following description will discuss, with reference to FIG. 10, (i) a method for measuring tensile strength of a long separator sheet which has each of the values of R/P shown in (c) of FIG. 8 and in which the heat resistant layer 4 is laminated on one surface of the porous film 5 and (ii) results of the measurement. Specifically, the following description will discuss (i) a method for measuring tensile strength of each of long separator sheets 12a" and 12b" in which wholly aromatic polyamide (aramid resin) as the heat resistant layer 4 is laminated on one surface of a poly olefin separator which is the porous film 5 and (ii) results of the measurement.

FIG. 10 is a view for explaining (i) a method for measuring tensile strength of a specimen 12e whose one lateral surface is a lateral surface 12c" of each of the long separator sheets 12a" and 12b" which are wound into respective separator rolls 12U" and 12L".

The separator rolls 12U" and 12L" illustrated, in (a) of FIG. 10 are obtained by winding 200 m of the respective long separator sheets 12a" and 12b" on respective cores u and l having a diameter of 3 inches. Here, the long separator sheets 12a" and 12b" have been obtained by slitting a separator original sheet, in which wholly aromatic polyamide as a heat resistant layer is laminated on one surface of a porous film made of polyethylene, in a lengthwise direction (MD) of the original sheet.

The specimen 12e has been prepared by cutting, with use of a cutter, out from each of the long separator sheets 12a" and 12b" so as to include, as one lateral surface, the lateral surface 12c" of each of the long separator sheets 12a" and 12b" and to have a size of 1 cm (width)×5 cm (length).

As illustrated in (b) of FIG. 10, upper and lower parts (each having a length of 1.5 cm) of the specimen 12e are placed on respective chucks (holding base) 14a and 14b, and a distance between the chuck 14a and the chuck 14b is 2 cm.

Note that the tensile strength was measured based on "JIS K 7161 Plastics-Determination of tensile properties". The followings are concrete measuring device and measurement conditions which were employed.

Device: TENSILON Universal Material Testing Instrument (A&D Company, Limited, Type RTF-1210)
Specimen: 5 cm×1 cm
Test speed (speed of chuck 14a): 100 mm/mm
Number of measurement: 3 times
Chuck-to-chuck distance: 2 cm
Test direction: Lengthwise direction (MD) of long separator sheet A tensile strength X (MPa) was calculated from a stress A (N) with which the specimen 12e was torn. Specifically, the tensile strength X (MPa) was calculated based on the following (Formula 1):

Tensile strength $X$ (MPa)=load $A$ (N)/(width of specimen (mm)×film thickness of specimen (mm))     (Formula 1)

As illustrated in (c) of FIG. 10, as compared with specimens (edge length (R)/longer side length (P): 1,047; razor n=1, razor n=2, razor n=3) obtained from a long separator sheet which has been obtained by slitting, with the razor cutting method, a separator original sheet, in which wholly aromatic polyamide as a heat resistant layer is laminated on one surface of a porous film, made of polyethylene, it is found that the load (N) with which the specimens 12e (edge length (R)/longer side length (P): 1.000; shear cutting n=1, shear cutting n=2, shear cutting n=3) were torn is larger.

As shown in (d) of FIG. 10, an average tensile strength X (MPa) of the specimens (razor n=1, razor n=2, razor n=3) is 2.12 Mpa, and an average tensile strength X (MPa) of the specimens 12e (shear cutting n=1, shear cutting n=2, shear cutting n=3) is 224 Mpa. From these results, the tensile strength of the specimens 12e each having the lateral surface obtained by slitting with the shear cutting is evidently larger than the tensile strength of the specimens each having the lateral surface obtained by slitting with the razor cutting method.

A larger tensile strength means to be tougher against stretching. In a case where a slit lateral surface is uneven as in the specimens having the lateral surface obtained by slitting with the razor cutting method, concentration of stress occurs in stretching, and accordingly breaking may be more likely to occur.

(Charpy Impact Test)

The following description will discuss, with reference to FIG. 11, (i) a measuring method in the Charpy impact test on a long separator sheet which has each of the values of: R/P shown in (c) of FIG. 8 and in which the heat resistant layer 4 is laminated on one surface of the porous film 5 and (ii) results of the measurement. Specifically, the following description will discuss (i) a measuring method in the Charpy impact test on each of long separator sheets 12a" and 12b" in which wholly aromatic polyamide (aramid resin) as the heat resistant layer 4 is laminated on one surface of a polyolefin separator which is the porous film 5 and (ii) results of the measurement.

FIG. 11 is a view for explaining (i) a measuring method in the Charpy impact test on a specimen 12f whose one lateral surface is a lateral surface 12c" of each of the long separator sheets 12a" and 12b" which are wound into respective separator rolls 12U" and 12L".

The separator rolls 12U" and 12L" illustrated in (a) of FIG. 11 are obtained by winding 200 m of the respective long separator sheets 12a" and 12b" on respective cores u and l having a diameter of 3 inches. Here, the long separator sheets 12a" and 12b" have been obtained by slitting a separator original sheet, in which wholly aromatic polyamide as a heat resistant layer is laminated on one surface of a porous film made of polyethylene, in a lengthwise direction (MD) of the original sheet.

The specimen 12f has been prepared by cutting, with use of a cutter, out from each of the long separator sheets 12a" and 12b" so as to include, as one lateral surface, the lateral surface 12c" of each of the long separator sheets 12a" and 12b" and to have a size of 1 cm (width)×8 cm (length).

Note that the Charpy impact test was carried out based on "JIS K 7111-1 Plastics-Determination of Charpy impact properties". The followings are concrete measuring device and measurement conditions which were employed.

Device: UNIVERSAL IMPACT TESTER (YASUDA SEIKI SEISAKUSHO, LTD., No. 258)
Specimen: 8 cm×1 cm
Lifting angle: 150°
Number of measurement: 5 times
Pendulum (hammer) capacity: 1 J
Number of specimen: 1 sheet
Notch in specimen: None
Test direction: Transverse direction (TD)

Note that, normally, a notch is provided in a specimen for the Charpy impact test. However, in this experiment, a shape itself of a slit edge part of a specimen is evaluated, and therefore no notch is additionally provided in the sample which has been cut out in a rectangular shape.

(b) of FIG. 11 is a schematic view for explaining a measuring method in the Charpy impact test on the specimen 12f, and (c) of FIG. 11 is a view showing results of the Charpy impact test on the specimen 12f.

As illustrated in (b) of FIG. 11, a pendulum (hammer) 15 which is heavy is swung down onto the specimen 12f from a height h', and then the pendulum 15 breaks the specimen 12f and is then swung up to a height h. Note that a distance k is a distance between a rotation center of the pendulum 15 and a center of gravity of the pendulum 15.

An angle $\alpha$ in (b) of FIG. 11 does not change in accordance with replacement of the specimen, and indicates a lifting angle. Meanwhile, an angle $\beta$ in (b) of FIG. 11 is an angle of the pendulum 15. The angle ($\beta$) of the pendulum 15 becomes smaller when energy consumed to break the specimen is larger, and the angle ($\beta$) of the pendulum 15 becomes larger when energy consumed to break the specimen is smaller.

That is, the pendulum 15 is swung down from the predetermined height h' regardless of types of the specimen, and therefore initial energy (potential energy) of the pendulum 15 is constant. From this, the angle ($\beta$) of the pendulum 15 represents residual energy obtained by subtracting, from the initial energy, energy consumed to break the specimen.

As illustrated in (c) of FIG. 11, an average angle ($\beta$) of the pendulum 15 in the 5-time trials was 114.9° in regard to the specimens (edge length (R)/longer side length (P): 1.000) which had been obtained from the long separator sheet obtained by slitting, with the shear cutting method, the separator original sheet in which wholly aromatic polyamide as the heat resistant layer was laminated on one surface of the porous film made of polyethylene. Meanwhile, an average angle ($\beta$) of the pendulum 15 in the 5-time trials was 117.4° in regard to the specimens (edge length (R)/longer side length (P): 1.047) which had been obtained from the long separator sheet obtained by slitting, with the razor cutting method, the separator original sheet in which wholly aromatic polyamide as the heat resistant layer was laminated on one surface of the porous film made of polyethylene.

From the above results, it is found that the specimen having the lateral surface with inferior straightness is easily broken, as compared with the specimen 12f having the lateral surface with high straightness.

[Main Points]

In the long porous separator sheet in accordance with an aspect 1 of the present invention, a lateral surface of the long porous separator sheet has a value of R/P that is less than 1.04, where P is a linear distance between two points on a straight line in a lengthwise direction in an image of the lateral surface, and R is a distance along a shape of the lateral surface between the two points on the straight line in the lengthwise direction, the linear distance P and the distance R being obtained by binarizing the image between the long porous separator sheet and a part other than the long porous separator sheet.

According to the configuration, the value of R/P of the lateral surface of the long porous separator sheet is less than 1.04. As such, the straightness of the lateral surface is high even though the long porous separator sheet is made of a porous material, and it is therefore possible to reduce a possibility that the long separator sheet is torn in processing.

The long porous separator sheet in accordance with an aspect 2 of the present invention can include, in the aspect 1, a plurality of layers.

According to the configuration, it is possible to provide the long porous separator sheet which is made up of a plurality of layers.

In the long porous separator sheet in accordance with an aspect 3 of the present invention, it is possible in the aspect 2 that the plurality of layers are a porous film layer and a porous heat resistant layer which is laminated on one surface of the porous film layer.

According to the configuration, it is possible to provide the long porous separator sheet in which the porous heat resistant layer is laminated on the one surface.

In the long porous separator sheet in accordance with art aspect 4 of the present invention, it is possible in the aspect 2 that the plurality of layers are a porous film layer and porous heat resistant layers which are laminated on both surfaces of the porous film layer.

According to the configuration, it is possible to provide the long porous separator sheet in which the porous heat resistant layers are laminated on the both surfaces.

In the long porous separator sheet in accordance with an aspect 5 of the present invention, it is possible in any one of the aspects 1 through 4 that the lateral surface of the long porous separator sheet is obtained by being slit in a slitting section including an upper blade and a lower blade which rotate in different directions, the upper blade making contact with one of two lower blades in a space formed between the two lower blades which are adjacent in a transverse direction that is perpendicular to the lengthwise direction.

According to the configuration, it is possible to provide the long porous separator sheet whose lateral surface has high straightness.

The porous separator roll in accordance with an aspect 6 of the present invention is configured by winding, on a core, the long porous separator sheet described in any one of the aspects 1 through 5.

According to the configuration, it is possible to provide the porous separator roll obtained by winding, on a core, the long porous separator sheet whose lateral surface has high straightness.

The lithium-ion battery in accordance with an aspect 7 of the present invention is configured to include a porous separator which has been obtained by cutting, in a predetermined length, the long porous separator sheet described in any one of the aspects 1 through 5 in a transverse direction that is perpendicular to the lengthwise direction.

According to the configuration, it is possible to provide the lithium-ion battery which includes the porous separator whose lateral surface has high straightness.

The method in accordance with an aspect 8 of the present invention for producing a long porous separator sheet includes the step of slitting a porous separator original sheet in a lengthwise direction of the porous separator original sheet, the slitting step including forming a lateral surface of the long porous separator sheet with use of a slitting section including an upper blade and a lower blade which rotate in different directions, the upper blade making contact with one of two lower blades in a space formed between the two lower blades which are adjacent in a transverse direction that is perpendicular to the lengthwise direction.

According to the method, it is possible to form the lateral surface of the long porous separator sheet whose straightness is high even though the long porous separator sheet is made of a porous material. It is therefore possible to reduce a possibility that the long separator sheet is torn in processing.

[Additional Remarks]

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention can be used in a long porous separator sheet, a method for producing the long porous separator sheet, a roll of the long porous separator sheet, a lithium-ion battery, and the like.

REFERENCE SIGNS LIST

1: Lithium-ion secondary battery
4: Heat resistant layer (porous heat resistant layer)
5: Porous film (porous film layer)
6: Slitting apparatus
7: Cutting device
12: Separator (porous separator)
12a: Long separator sheet (long porous separator sheet)
12b: Long separator sheet (long porous separator sheet)
12c: Lateral surface
12d: Lateral surface
12a": Long separator sheet (long porous separator sheet)
12b": Long separator sheet, (long porous separator sheet)
12c": Lateral surface
12d": Lateral surface
12U: Separator roll (porous separator roll)
12L: Separator roll (porous separator roll)
12U": Separator roll (porous separator roll)
12L": Separator roll (porous separator roll)
12O: Separator original sheet (porous separator original sheet)
66: Lower shaft
66a: Lower blade
66b: Space
67: Upper shaft
67a: Upper blade
67b: Flat part
67c: Inclined part
1: Core
u: Core
MD: Lengthwise direction of long separator sheet or separator original sheet
TD: Transverse direction of long separator sheet or separator original sheet
S: Slitting section
Surface A: Surface of porous film which surface is opposite to surface making contact with heat resistant layer
Surface B: Surface of heat resistant layer which surface is opposite to surface making contact with porous film
O: Left side length
P: Longer side length (linear distance between two points on straight line in lengthwise direction)
Q: Right side length
R: Edge length (distance along shape of lateral surface between two points on straight line in lengthwise direction)

The invention claimed is:

1. A method for producing a roll of a long porous separator sheet, said method comprising a step of slitting a porous separator original sheet in a lengthwise direction of the porous separator original sheet to obtain the long porous separator sheet, wherein the long porous separator sheet includes a plurality of layers which are a porous film layer and a porous heat resistant layer that is laminated on one surface of the porous film layer, wherein the porous heat resistant layer has a melting temperature higher than a melting temperature of the porous film layer, the slitting step including forming a lateral surface of the long porous separator sheet using a slitting section including an upper circular blade and lower blades which rotate in different directions, the upper blade making contact with one of two lower blades in a space formed between two lower blades which are adjacent in a transverse direction that is perpendicular to the lengthwise direction, the lower blades having diameters smaller than that of the upper blade, the lateral surface being formed by bringing the upper blade into contact with a surface of the porous film layer which surface is opposite to a surface contacting the porous heat resistant layer, transferring the long porous separator sheet to a winding-up roller via a roller positioned below the slitting section, and winding the long porous separator sheet on a core of the winding-up roller to form the roll of the long porous separator sheet.

* * * * *